INVENTOR
W. M. BEAUMONT
BY
G. F. Kane
ATTORNEY

Sept. 18, 1951 W. M. BEAUMONT 2,568,138

COMBINED LINE AND TRIPPING RELAY CIRCUIT FOR TELEPHONE LINES

Filed May 25, 1949 2 Sheets-Sheet 2

INVENTOR
W. M. BEAUMONT
BY
G. F. Kane
ATTORNEY

Patented Sept. 18, 1951

2,568,138

UNITED STATES PATENT OFFICE 2,568,138

COMBINED LINE AND TRIPPING RELAY CIRCUIT FOR TELEPHONE LINES

William M. Beaumont, Summit, N. J., assignor to Bell Telephone Laboratories, Incorporated, New York, N. Y., a corporation of New York Application May 25, 1949, Serial No. 95,344

8 Claims. (Cl. 179—28)

This invention relates to telephone systems and more particularly to telephone systems of the type in which subscribers' lines, served by a private branch exchange, have access also to the services of a key equipment attendant.

In the particular type of system to which this invention relates, station or extension lines are terminated in jacks at a private branch exchange and also in keys at each of a group of attendants' key-equipped positions. Under normal conditions the lines are served principally by the key equipment while under other conditions, chiefly at night and when the key equipment is unattended, they are served by the private branch exchange. At the key equipment means are provided for recording the origination of calls at any of the stations served thereby and also for signaling such stations and for completing communication connections between them and the key equipment attendant's telephone.

It is the object of this invention to enlarge the field of use of telephone facilities of the type known generally as key equipments and to simplify and otherwise improve subscribers' line circuits served thereby.

This object is attained in accordance with a feature of the invention by adapting a key equipment for use on party lines.

Another feature of the invention provides facilities whereby each station on a party line may be selectively signaled on a locked-in basis, thus enabling the key equipment attendant to initiate a signaling operation and then to undertake other duties pending the response of the party at the called station.

A further feature of the invention resides in the provision of facilities whereby the key equipment attendant may elect to signal a called station either on a locked-in basis or on a non-locked-in basis.

A still further feature of the invention contemplates the use of a single relay in a subscriber's line circuit to serve the dual purposes of a line relay and a tripping relay.

Figure 1:
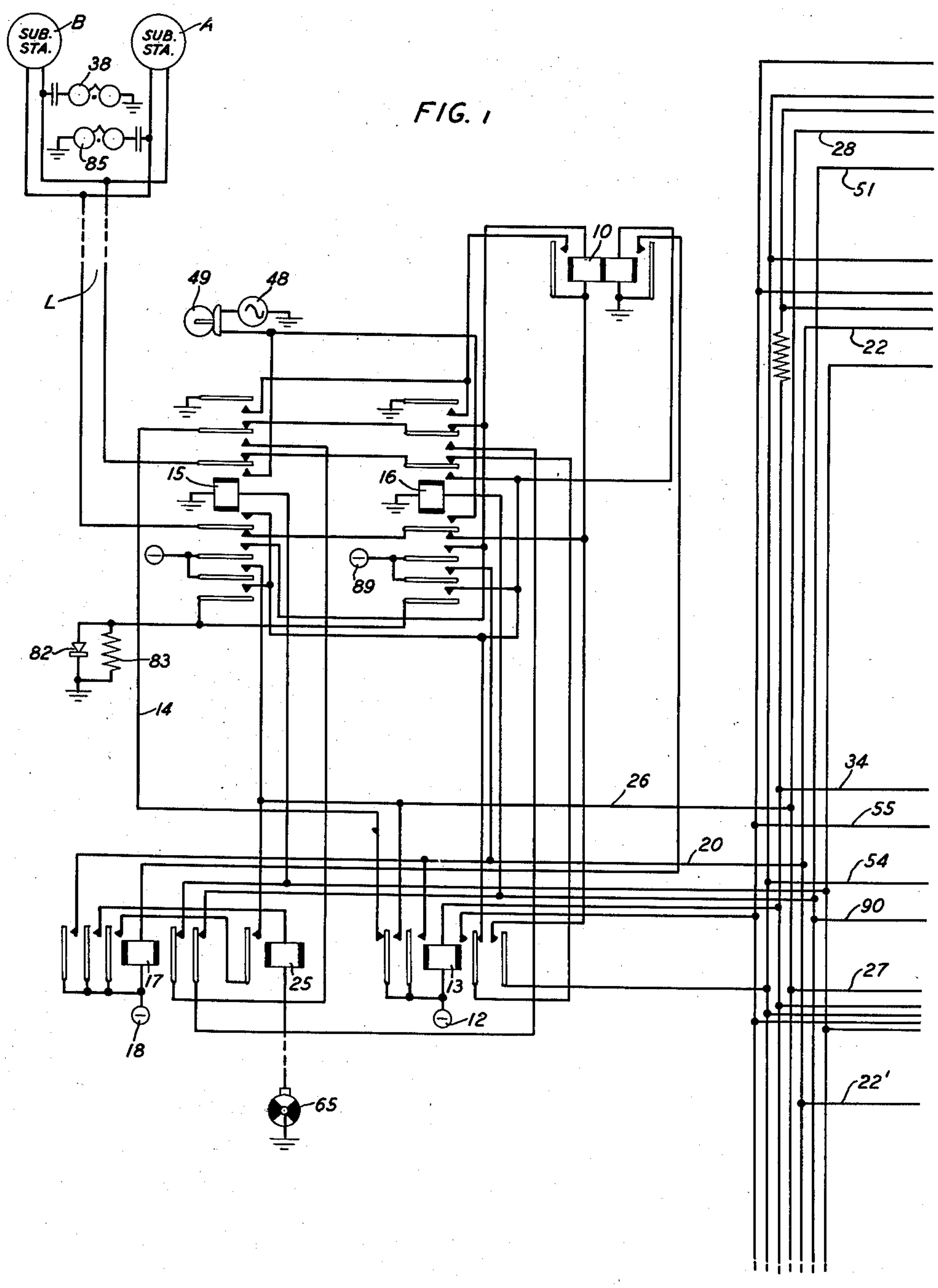
Figure 2:
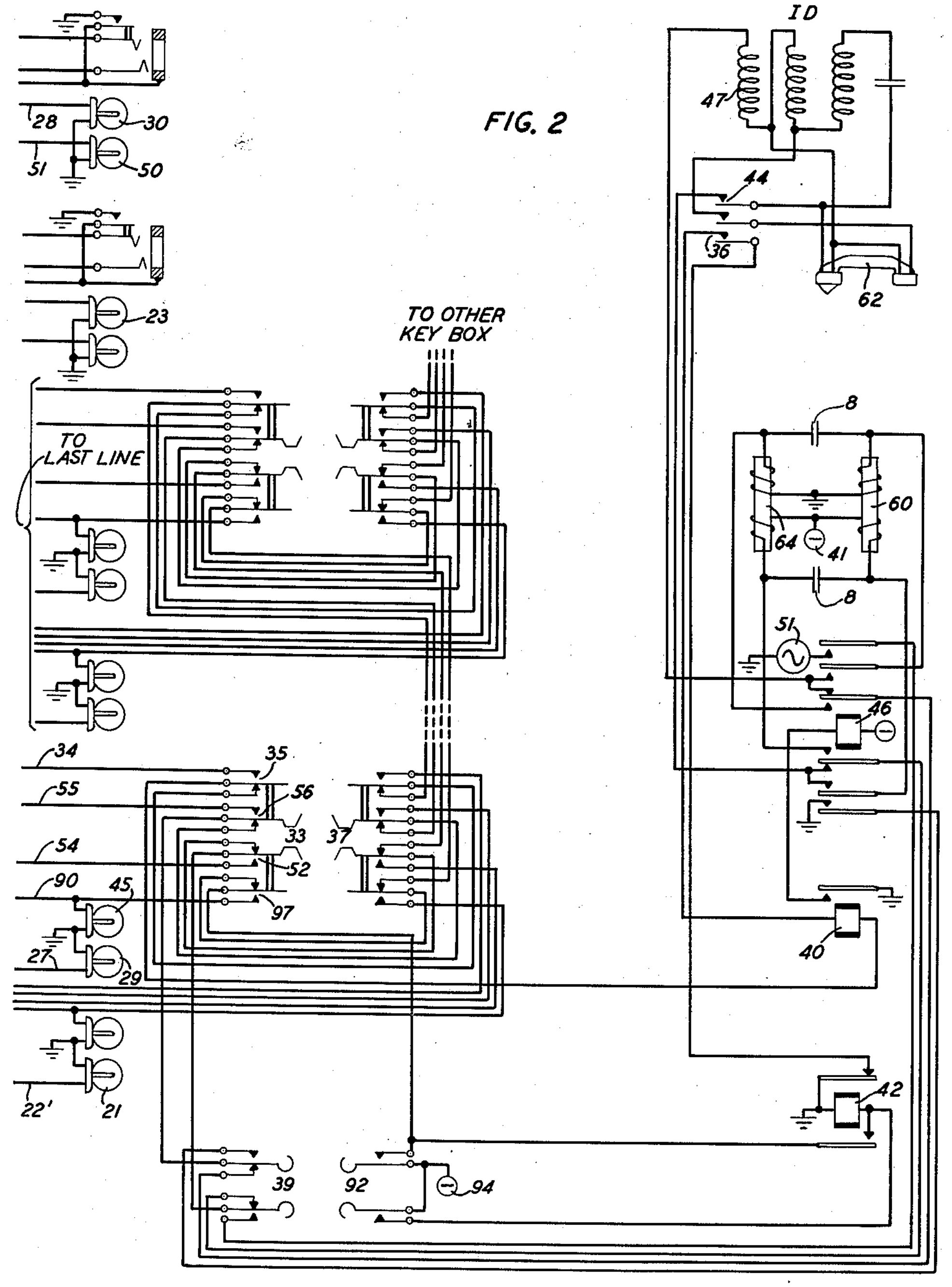

These and other features of the invention will be better understood from the following description when read in connection with the accompanying drawings in which:

Fig. 1 is a circuit diagram illustrating a two-party line circuit involving features of the invention; and Fig. 2 is a circuit diagram illustrating the key equipment and private branch exchange terminations of the two-party line shown in Fig. 1, and also disclosing the key equipment attendant's telephone circuit and other switching instrumentalities essential to the operation of the system and which, when placed to the right of Fig. 1 discloses therewith a complete system.

Before entering into a detailed description of the operation of the system a brief outline of the circuits disclosed in the drawings will be given.

In Fig. 1 the line L illustrates a two-party line on which are located the "ring" party station A and the "tip" party station B. At station A the ringer, or audible signaling device, and its associated condenser are connected between ground and the ring conductor of line L whereas the ringer at station B and its associated condenser are connected between ground and the tip conductor of line L. Either ringer may be selectively actuated over the line L on either a locked-in or a non-locked-in basis as determined by the attendant at the key equipment. The relay 10 functions as a line relay in response to the origination of a call at either station A or station B, and as a tripping relay to trip the ringing current when the party at either station A or station B responds to an incoming ringing signal which was transmitted on a locked-in basis.

In the upper left portion of Fig. 2 are shown the private branch exchange jack terminations of the two-party line of Fig. 1 and their associated "line and busy" and "hold" signaling devices. Similar visual signaling devices are shown located at the key equipment which, for purposes of simplicity, is shown as comprising but two sets of line keys, each set consisting of two keys, such as 33 and 37, individually assigned to the ring and tip stations of the corresponding line. The key equipment also includes a ringing key and a hold key the latter of which is used to effect the locked-in signaling feature of this invention. Either line key, such as 33 and 37, may be employed to answer a call originated at either station A or B but on a call directed to either station the keys must be operated in accordance with their particular allocations in order to provide for the selective signaling of the corresponding stations. The attendant's telephone shown in Fig. 2 is of the well known anti-sidetone type and the illustrated relays function incident to the removal of the telephone from its mounting and the operation of a station selecting key to connect talking battery to both the attendant's telephone set and the line L.

The system operates in the following manner:

*Call originated at a station on party line*

On a call originated at one of the stations on the two-party line L, "ring" station A for example, the telephone at the station is removed from its support in the usual manner whereupon relay 10 operates as a line relay. The operating circuit for relay 10 extends from the current source 12, over the outer left armature and back contact of relay 13, conductor 14, upper middle armature and back contact of relay 15, upper middle armature and back contact of relay 16, left winding of relay 10, back contacts and innermost lower armatures of relays 16 and 15, ring conductor of line L, closed switchhook contacts at station A, tip conductor of line L, innermost upper armatures and back contacts of relays 15 and 16, inner right armature and back contact of relay 13, right winding of relay 10, to ground. With both windings energized in series relay 10 operates its armatures. The left armature of relay 10 performs no useful function at this time. At its right armature and front contact relay 10 completes an obvious operating circuit for relay 17.

At its outermost left armature and front contact relay 17 completes a circuit extending from the current source 18, over the outermost left armature and front contact of relay 17, conductor 20, thence in parallel over conductors 22 and 22' to ground by way of the filaments of "line and busy" lamps 23 and 21 to ground. Lamp 23, lighted, serves to busy the line L at the private branch exchange jack corresponding to the "tip" station wheras lamp 21, lighted, serves the same purpose at the attendant's key box.

At its middle left armature and front contact relay 17 completes a circuit extending from ground, through the interrupter 65, winding of relay 25, front contact and middle left armature of relay 17, to current source 18. Relay 17 operates intermittently in this circuit under control of the interrupter. At its armature and front contact relay 25 intermittently closes and oens the circuit extending from the source 18, over the innermost left armature and front contact of relay 17, armature and contact of relay 25, conductors 26 and 27 to ground by way of the filament of lamp 29. From conductor 26 there also extends a path including conductor 28, the filament of lamp 30, at the private branch exchange and ground. Lamps 29 and 30 flash in these circuits to indicate that the party at station A on line L has originated a call. During light load periods and while the key equipment is unattended the call would be answered at the private branch exchange.

The attendant at the key equipment noting the flashing "line and busy" lamp 29 operates key 33 corresponding thereto or associated therewith, and removes the telephone 62 from its support. The operation of key 33 and the removal of the telephone 62 from its support causes relay 13 to operate in a circuit extending from source 12, through the winding of relay 13, conductor 34, contacts 35 of key 33, winding of relay 40, switchhook contacts 36, to ground at the back contact and upper armature of relay 42.

Relay 13, at its inner right armature and back contact, opens the operating circuit for relay 10; at its two right armatures and front contacts partly closes the talking leads from the key equipment to the calling station A; and at its outer left armature and front contact connects steady current from source 12 to conductor 26 and thence to conductors 27 and 28 to light the "line and busy" lamps 29 and 30 steadily. Relay 10 released, causes relay 17 to release which, in turn, causes relay 25 to release. At its inner left armature and front contact relay 13 maintains lamps 21 and 23 lighted steadily.

Relay 40 operates in series with relay 13 and, at its armature and front contact completes an obvious operating circuit for relay 46. Relay 46 connects battery supply to the attendant's telephone set in a circuit extending from the source 41, lower winding of retard coil 60, middle lower armature and front contact of relay 46, switchhook contacts 44, the transmitter of telephone handset 62, winding 47 of induction coil ID, front contact and middle upper armature of relay 46, upper winding of retard coil 60 to ground.

Relay 46 also connects talking battery to the calling station A in a circuit extending from the source 41, lower winding of retard coil 64, front contact and innermost lower armature of relay 46, lower normally closed contacts of ringing key 39, contacts 52 of key 33, conductor 54, outer right armature and front contact of relay 13, back contacts and innermost lower armatures of relays 16 and 15, ring conductor of line L, the telephone instrument at station A, tip conductor of line L, innermost upper armatures and back contacts of relays 15 and 16, inner right armature and front contact of relay 13, conductor 55, contacts 56 of key 33, upper normally closed contacts of key 39, innermost upper armature and front contact of relay 46, upper winding of retard coil 64, to ground. The two battery supply circuits just traced are interconnected by means of condensers 8. The party at calling station A and the attendant at the key equipment may now converse.

At the termination of conversation the calling party and the attendant restore their respective telephones and the attendant restores the key 33 to normal. Obvious equipment releases incident to these operations restore the circuit to normal.

It will be understood that should the party at the tip station B instead of the party at the ring staion A originate a call the circuit operation is identical and, to answer the call the attendant may operate either the ring party key 33, as described, or the tip party key 37 in response to the flashing lamp signal 29.

*Call originated at key equipment*

Should the attendant in charge of the key equipment desire to extend a call to the station A, for example, the key 33, corresponding to that station is operated and the telephone 62 removed from its support. Relay 13 operates in the circuit previously traced in series with relay 40 which relay also operates. These relays perform the same functions described in connection with the operation of key 33 in response to the call originated at station A. The talking circuit, of course, is not completed since the handset at station A is not yet removed from its support.

Following the operation of key 33 the attendant operates ringing key 39 to signal the called station. It will be assumed at this time that conditions at the key equipment do not require the called party to be signaled on a "locked-in" basis. With key 39 operated a circuit is completed from the grounded ringing current source 51, over the front contact and outermost upper armature of relay 46, lower alternate contacts of key 39, contacts 52 of key 33, conductor 54, outer right armature and front contact of relay 13, back contacts and innermost lower armatures of relays 16 and 15, ring conductor of line L, ringer 85 and its associated condenser at station A, to ground. The ringer 85 responds to current from the source 51 in well-known manner.

For descriptive purposes it will be assumed that the party at station does not answer the ringer signal and the attendant wishes to maintain the call signal operating while engaging in other duties. To accomplish this the attendant operates key 92 whereupon relay 16 operates in a circuit extending from the source 94, over the upper alternate contacts of key 92, contacts 97 of key 33, conductor 90, winding of relay 16, to ground. Relay 42 also operates in an obvious circuit incident to the operation of key 92.

Relay 42, operated, releases relays 13 and 40 and locks in a circuit which may be traced from current source 12, outer left armature and back contact of relay 13, conductor 14, middle upper armature and back contact of relay 15, middle upper armature and front contact of relay 16, outer right armature and back contact of relay 17, conductor 90, contacts 97 of key 33, lower armature and front contact of relay 42, its winding and ground.

Relay 16, operated, locks in a circuit extending from current source 12, outer left armature and back contact of relay 13, conductor 14, upper middle armature and back contact of relay 15, upper middle armature and front contact of relay 16, outer right armature and back contact of relay 17, winding of relay 16, to ground.

With relay 16 operated and locked, a signaling circuit to called station A is completed extending from the grounded ringing current source 48, through the resistance lamp 49, front contact and innermost lower armature of relay 16, back contact and innermost lower armature of relay 15, ring conductor of line L, to ground through ringer 85 and its associated condenser.

Relay 16 at its outermost lower armature and front contact and innermost upper armature and front contact connects the right winding of relay 10 and the varistor 82 and associated resistance 83 to the line for tripping the ringing current as will be described hereinafter. Relay 16 also maintains the "line and busy" lamps lighted in a circuit extending from the current source 89, third lower armature and front contact of relay 16, conductor 20, thence in parallel over conductors 22 and 22′ to ground by way of the filaments of lamps 23 and 21, the former at the private branch exchange and the latter at the key equipment.

The hold lamp 45 is lighted in a circuit including the source 12 and a portion of the circuit over which relay 42 is held operated, as is also hold lamp 50 at the private branch exchange by way of conductor 51.

When the called party at station A answers by removing the handset from its mounting, relay 10 operates, as a tripping relay, in a circuit which extends from the source 48, over resistance lamp 49, front contact and innermost lower armature of relay 16, back contact and innermost lower armature of relay 15, ring conductor of line L, through the telephone set at station A, tip conductor of line L, innermost upper armature and back contact of relay 15, innermost upper armature and front contact of relay 16, and thence to ground over two parallel paths, one including the right winding of relay 10, and the other including the front contact and outermost lower armature of relay 16, varistor 82 and its parallelly connected resistance 83. One-half of the ringing cycle from source 48 traverses the varistor 82 and the other half of the ringing cycle goes through the right winding of relay 10, thus providing a unidirectional pulsating current for operating relay 10. The purpose of resistance 83 is to prevent relay 10 from operating due to the capacity between the tip and ring leads of the line.

When relay 10 operates, as described, it locks operated in a circuit extending from source of current 89, over the second lower armature and front contact of relay 16, left winding of relay 10, left armature and front contact of relay 10, to ground by way of the front contact and outermost upper armature of relay 16.

Relay 10, operated, causes relay 17 to operate over an obvious circuit. Relay 17 at its outer right armature and back contact opens the locking circuit to relay 16 causing this relay to release, whereupon the windings of relay 10 are reconnected across the line L. Relay 10 then operates over the closed loop at station A in a circuit hereinbefore described in connection with a call originated at station A. When relay 17 operated, the locking circuit for relay 42 is opened whereupon this relay releases and reestablishes the circuit for relays 40 and 13, the former operating relay 46 to reconnect talking battery to the attendant's telephone and to the called station A in a manner previously described. Relay 13 performs the same functions hereinbefore described in connection with a call originated at station A and answered by the attendant at the key equipment.

The station A and the attendant's key equipment are now connected for conversation. When the called party restores the telephone at station A to its mounting at the termination of conversation and the attendant returns the key 33 to normal position the circuit is restored to normal as previously described.

Had the attendant desired to call the subscriber at the tip station B instead of the subscriber at station A key 37 instead of key 33 would be operated. The operation of the system under this condition is the same as just described except that relay 15 is operated in place of relay 16 and performs identical functions as did relay 16. Obviously, also, the ringer 38 at the tip station B would be operated instead of the ringer 85 at station A.

What is claimed is:

1. The combinatinon, in a telephone system, of a subscriber's line, a telephone station on said line having a telephone set thereat, a relay included in said line, means effective solely upon the removal of the telephone set at said station incident to the origination of a call thereat for completing an operating circuit for said relay whereby said relay operates as a line relay, an attendant's position, a source of signaling current, means manually controlled at said position for connecting said signaling current source to said line, means for locking said signal current-connecting means operated, means effective incident to the removal of the telephone set at said station subsequent to the operation of said signal current-connecting means for completing an operating circuit for said relay including said source of signaling current whereby said relay operates as a signal current tripping relay, and means controlled by said relay when thus operated for releasing said signal current-connecting means.

2. The combination defined in the preceding claim and including signaling means at said position for recording the operation of said relay when operated as a line relay.

3. In a telephone system, a subscriber's line circuit, an attendant's position, a signal device at said position, a source of current, means controlled from said position for connecting said source of current to said line circuit, switching means for locking said current-connecting means operated, a relay, means including said relay effective incident to the origination of a call at said station for operating said signal device, and means including said relay effective subsequent to the operation of said current-connecting means and incident to the response of a call incoming on said subscriber's line for operating said switching means whereby said source of current is disconnected from said line circuit.

4. In a telephone system, a subscriber's line, a station on said line having a telephone thereat, an attendant's position, a signal device thereat, means including a relay controlled by the telephone switchhook contacts at said station when actuated to originate a call for operating said signal device, a source of signaling current, means at said position for connecting said source of signaling current to said line, and means including the same relay controlled by the telephone switchhook contacts at said station when actuated subsequent to the operation of said current-connecting means for disconnecting said source of current from said line.

5. In a telephone system, a subscriber's line, a station on said line, an attendant's position, a signal device at said attendant's position, a source of direct current, a source of alternating current, means at said attendant's position for connecting said source of alternating current to said line, a relay, means effective incident to the origination of a call at said station for completing an operating circuit for said relay which includes said source of direct current whereby said relay functions to operate said signal device, and means effective incident to the response at said station to a call originated at said position and subsequent to the operation of said alternating-current connecting means for completing an operating circuit for said relay which includes said source of alternating current.

6. In a telephone system, a subscriber's line circuit, a station on said line circuit, an attendant's position, a signaling device at said position, a relay in said line circuit controlling the operation of said signaling device, a source of signaling current, means controlled from said position for connecting said source of signaling current to said line circuit, means effective incident to the origination of a call at said station for completing an operating circuit for said relay whereupon said relay operates to control said signaling device, means effective incident to the response at said station to an incoming call subsequent to the operation of said signaling current-connecting means at said position for completing a different operating circuit for said relay, and means controlled by said relay when operated over the said different operating circuit for causing the disconnection of said source of signaling current from said line circuit.

7. In a telephone system, a line circuit, a plurality of stations on said line, an attendant's position, a source of signaling current, means at said position for connecting said source of signaling current to said line to selectively signal said stations, a second source of signaling current, a key at said position, switching means responsive to the actuation of said key for connecting said second source of current to said line, means locking said switching means operated, and means controlled from a station on said line incident to the response thereat to a call incoming thereto for releasing said switching means.

8. In a telephone system a subscriber's line having a station thereon, an attendant's position, a source of signaling current, a key at said position, a relay in said line, means responsive to the removal of the telephone at said station from its mounting to originate a call for operating said relay as a line relay, means responsive to the operation of said key for connecting said source of current to said line and for preparing an operating circuit for said relay, and means effective incident to the removal of the telephone at said station subsequent to the actuation of said key for completing the operating circuit for said relay.

WILLIAM M. BEAUMONT.

REFERENCES CITED

The following references are of record in the file of this patent:

UNITED STATES PATENTS

| Number | Name | Date |
|---|---|---|
| 1,912,510 | Bradford | June 6, 1933 |
| 2,064,186 | Voss | Dec. 15, 1936 |
| 2,070,642 | Beaumont | Feb. 16, 1937 |
| 2,466,484 | Schroeppel | Apr. 5, 1949 |